United States Patent [19]

Loegering et al.

[11] Patent Number: 5,429,429
[45] Date of Patent: Jul. 4, 1995

[54] TRACK BOLSTER FOR A TRACK SECTION OF A REMOVABLE FLEXIBLE TRACK BELT

[76] Inventors: George A. Loegering, 15970 35th St., Casselton, N. Dak. 58012; Steven W. Loegering, 412 E. 19th St., West Fargo, N. Dak. 58078

[21] Appl. No.: 8,178

[22] Filed: Jan. 25, 1993

Related U.S. Application Data

[63] Continuation-in-part of Ser. No. 937,498, Aug. 28, 1992, Pat. No. 5,284,387.

[51] Int. Cl.[6] .................. B62D 55/088; B62D 55/275
[52] U.S. Cl. ......................................... 305/56; 305/51
[58] Field of Search ....................... 305/13, 39, 45, 46, 305/51, 56, 57

[56] References Cited

U.S. PATENT DOCUMENTS

| | | | |
|---|---|---|---|
| 2,532,824 | 12/1950 | Sinclair | 305/56 |
| 2,686,697 | 8/1954 | Baker | 305/51 X |
| 3,165,364 | 1/1965 | Hardman et al. | 305/13 |
| 3,497,271 | 2/1970 | Keller | 305/13 |
| 4,089,565 | 5/1978 | Loegering et al. | 305/45 |
| 4,099,794 | 7/1978 | Hoffart | 305/13 |
| 4,165,906 | 8/1979 | Fix | 305/51 |
| 4,482,193 | 11/1984 | Boggs et al. | 305/51 |
| 4,880,283 | 11/1989 | Savage et al. | 305/51 X |

FOREIGN PATENT DOCUMENTS

794074 4/1958 United Kingdom ................. 305/51

OTHER PUBLICATIONS

"Florida Firm Unveils Rubber-Track Tractors", 1 pg. (1990).
"Supertracks from MartinTraction", 2 pp. (1981).
"World Equipment Sales", 3 pp. (1983).
"Mocassin M" and Mocassin SM, 2 pp. (1987).
"Bombardier", 1 pg. (1991).
"Takeuchi Model TL26 track loader", 1 pg. (1992).
"Truck Tracks", 3 pp. (1992).

Primary Examiner—Russell D. Stormer
Attorney, Agent, or Firm—Moore & Hansen

[57] ABSTRACT

The present invention provides a cushioned track section adapted to be linked to a plurality of similar cushioned track sections to form a flexible track belt for wrap around mounting on a vehicle tire, each cushioned track section having a rigid ground engaging base pad, a pair of spaced apart side wall structures that include a side plate, and a track bolster comprising a substrate and a cushion attached thereto, the cushion including a ground engaging surface.

28 Claims, 4 Drawing Sheets

TRACK BOLSTER FOR A TRACK SECTION OF A REMOVABLE FLEXIBLE TRACK BELT

The application is a continuation-in-part of U.S. patent application Ser. No. 07/937,498 filed Aug. 28, 1992, now U.S. Pat. No. 5,284,387 to Loegering.

The present invention generally relates to a cushioned track section for a removable, flexible track belt, which is wrapped around vehicle tires to provide additional traction therefore, the cushioned track section comprising a track bolster having a cushion forming a ground engaging tread.

BACKGROUND OF THE PRESENT INVENTION

The use of an endless track as a traction enhancer for wheeled vehicles is well known. Typically, such belts comprise a plurality of individual track sections formed from a hard metal such as steel that are linked together for pivotal movement with respect to adjacent track sections. These track belts have traditionally been used to obtain better overall traction for the vehicle generally and in wet and slippery conditions particularly. Examples of such prior an track belts are disclosed in U.S. Pat. No. 3,497,271 to Keller, U.S. Pat. No. 4,089,565 to Loegering, et al., and U.S. Pat. No. 4,099,794 to Hoffart.

Generally, each of the track sections include a base pad structure having an elongated shape that engages the ground during operation of the vehicle. The base pad forms a cross bar that includes at least one cleat, and usually two, and that extends between a pair of opposed sidewalls, which in turn each extend generally upwardly from the base pad on opposite longitudinally spaced ends thereof. Adjacent track sections are linked together by a linkage mechanism. Usually, though not necessarily, the linkage mechanism includes the sidewalls having at least one clevis type structure that receives a link therebetween. In a double or dual pivot linkage such as that shown in the Keller '271 patent, the link extends between adjacent clevises of adjacent track sections. In the single pivot linkage, one end of the link is integral with the side wall of one of the track sections and extends into a pivotal engagement with the clevis of the adjacent track section. In both linkage mechanisms, the clevis and the link have aligned apertures that receive a fastener or pivot pin that forms therewith the pivotal link mechanism by which the adjacent track sections are connected. As noted, a double or dual pivot linkage mechanism includes a pair of clevis structures for each track section by which the track section is pivotally connected on both lateral sides to the adjacent track sections.

During operation of a vehicle utilizing such flexible belts, the vehicle tires are normally guided within the track sections by the side walls of the track section. The prior art track sections usually guide the tires by engaging the soft side wall of the tire. For example, both the Hoffart '794 and the Loegering '565 track sections each tend to guide the tire utilizing the tire side wall, resulting in side wall wear on the tire.

In addition, during normal operation, the vehicle will often experience forces directed sideways to the track belt, or along the longitudinal direction of extent of the individual track sections. When experiencing these side loading forces, the tires will tend to crawl upwardly along the sidewall of the track section. This side loading of the tires into the sidewall of the track section creates wear on the tire, in particular on the tire sidewall, which is usually thinner and softer than the tire tread and thus more susceptible to wear.

On uneven terrain, such as where rocks are encountered by one side of a track section, the track belt can experience significant rocking and flexing of the individual track sections relative to adjacent track sections or of an end of a single track section relative to the other end thereof. This rocking and flexing of the track sections also contributes to tire wear as well as significant wear on the linkage mechanism connecting adjacent track sections. In the single pivot linkage mechanism the pivot pin is forced to endure a significant weight transfer due to the rigidity of the linkage between adjacent track sections. That is, when an object is encountered by one side of the track section, the track section will tend to tilt. Since it is rigidly, and often integrally, attached at one end of the link, however, tilting of the track section is inhibited and the tilting load is transferred to the pin, which can cause significant, accelerated wear on the linkages of a single pivot linkage. The pin in effect acts as a saw, increasing the wear. Because the track sections of a double pivot linkage are pivotally attached at on both sides, the track section can pivot independently on one side of the pad with respect to the opposite side thereof, thereby lessening the load transfer to the pin, and thereby reducing the wear. As noted previously though, known double pivot linkages are relatively more flexible and therefore facilitate the tire wheels to walk out of the track belt.

The aforedescribed track belts are used frequently on vehicles in outdoor settings on earth or rock surfaces. Additionally, they are also finding increasing use on vehicles operating on artificial work surfaces such as concrete, asphalt, or like work surfaces. When used on such work surfaces, the cleats of the track sections will frequently damage the surface, particularly when used on skid-steer type of loaders, which tend to slide sideways on the track under certain operating conditions. Additionally, the engagement of the solid steel cleat with the concrete, asphalt or similar work surface can be noisy. Consequently, the use of the aforedescribed steel track belts has been limited primarily to non-concrete or similar work surfaces, that is, work surfaces where damage thereto is not a concern, and has thus reduced the market for these track belts in situations where they might otherwise find use.

It would be desirable to have an improved track belt formed of track sections that are cushioned to prevent or reduce damage to concrete or like surfaces and that reduce the noise associated with operating vehicles having such track belts on such surfaces.

SUMMARY OF THE PRESENT INVENTION

It is an object of the present invention to provide a new and improved invention that is not subject to the foregoing disadvantages.

It is another object of the present invention to provide a new and improved track bolster useful as an attachment to a track section of a wrap-around flexible belt for mounting on vehicle tires that causes reduced or no damage to a concrete or similar work surface.

It is still another object of the present invention to provide a new and improved track bolster useful as an attachment to a track section of a wrap-around flexible belt for mounting on vehicle tires that creates less operating noise than a vehicle operating with presently known track belts.

The foregoing objects of the present invention are accomplished and achieved by the present invention by providing a track bolster adapted for attachment to a track section of a flexible belt for wrap-around mounting engagement on at least one vehicle tire, wherein the track section has a rigid, ground engaging base pad and a pair of opposed, spaced apart side wall structures. Each side wall structure has a side plate having a substantially continuous, elongate, outwardly sloping configuration and includes upper and lower portions with the upper portion being bent inwardly relative to the lower portions. The lower portion of the side plate is substantially planar while the upper portion includes a somewhat convex tire engaging inner surface. Preferably, the lower portion is disposed at an angle of between about sixty-three degrees (63°) to about sixty-eight degrees (68°) relative to the base pad and the upper portion is disposed at an angle of about seventy degrees (70°) to about seventy-five degrees (75°), that is, the upper section is bent inwardly relative to the lower portion about four degrees (4°) to about seven degrees (7°).

The preferred embodiment of the track section of the present invention also has a pair of spaced apart side plate supports that project upwardly from opposite ends of the base pad, each of the side plate supports including inner and outer spaced apart, apertured support segments defining a slot or clevis therebetween. The dual pivot linkage mechanism for adjacent track sections includes the support segments, the apertures in the support segments, an apertured link arm that provides a first pivot along one side of the track section and a pivot or fastener pin inserted through the apertures in the support segments. A similar link arm and fastener pin attached to the other side of the same end of the track section provides the second pivot so as to form a dual pivot linkage mechanism on each end of the track section. In the preferred embodiment of the present invention, the support segment apertures are disposed a first distance above the ground when the track section is in a ground engaging position and are spaced a second distance apart from each other. Preferably, the first distance is within the range of about forty to seventy percent (40% to 70%) of the second distance, thereby substantially reducing the rocking and flexing otherwise found in known double pivot track sections.

The base pad has a cross section similar to an inverted "v" when in the ground-engaging position such that each base pad has a pair of diverging substantially planar cross bar members, which may be integral along an edge, with each cross bar member having a cleat that would otherwise engage the surface when the track bolster was not attached. The two spaced apart cleats define a recess therebetween. The track bolster comprises a substrate and a cushion fixedly attached thereto. The cushion can be made of a variety of materials, such as a thermoplastic resin such as urethane or polycarbonate. In one embodiment, the substrate comprises a substantially flat, central portion with an end portion extending angularly away from each end thereof. In this embodiment, the track bolster is attached to the track pad by a pair of U-shaped brackets that receive an end portion therein and which are fastened to the track pad by a bolt that extends through an aperture in the bracket, over the cross bar, and through another aperture in the bracket. In another embodiment, the track bolster may comprise a substrate and a cushion attached thereto wherein the substrate includes a pair of apertured ears extending upwardly from the substrate, the apertured ears receiving a bolt for attachment to the track pad. In still yet another embodiment of the present invention, the track bolster may include a substrate having a width greater than the width of the base pad and a cushion attached thereto. The additional width of the substrate may be bent over the diverging cleats of the base pad so as to rigidly attach the track bolster to the track section.

In each embodiment of the present invention, the cushion comprises a substantially rectangular, half-inch thick piece of material having a beveled surface on opposed ends to reduce the possibility of tearing the cushion away from the substrate during sideways movement of the vehicle.

The foregoing enumerated objects of the present invention, as well as others not explicitly set forth, will become apparent to those skilled in the art when the following detailed description of the present invention is read in conjunction with the accompanying drawings and claims. Throughout the drawings, like numerals refer to similar or identical parts.

DETAILED DESCRIPTION OF THE PRESENT INVENTION

Figure 1:
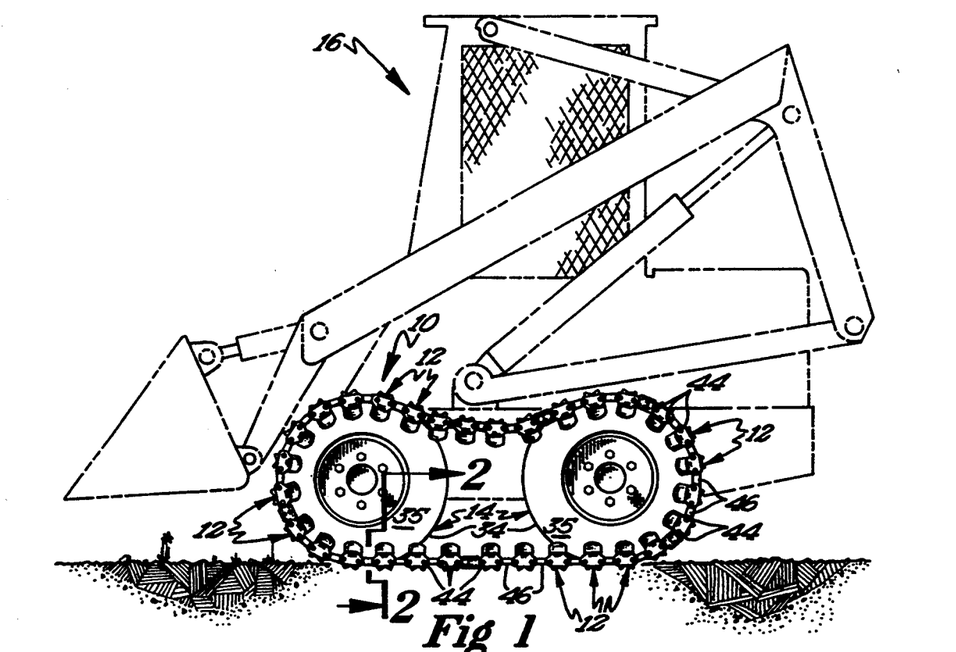
FIG. 1 shows a track belt of the type useful in accordance with the present invention mounted on a skid-steer loader.
Figures 7, 8:
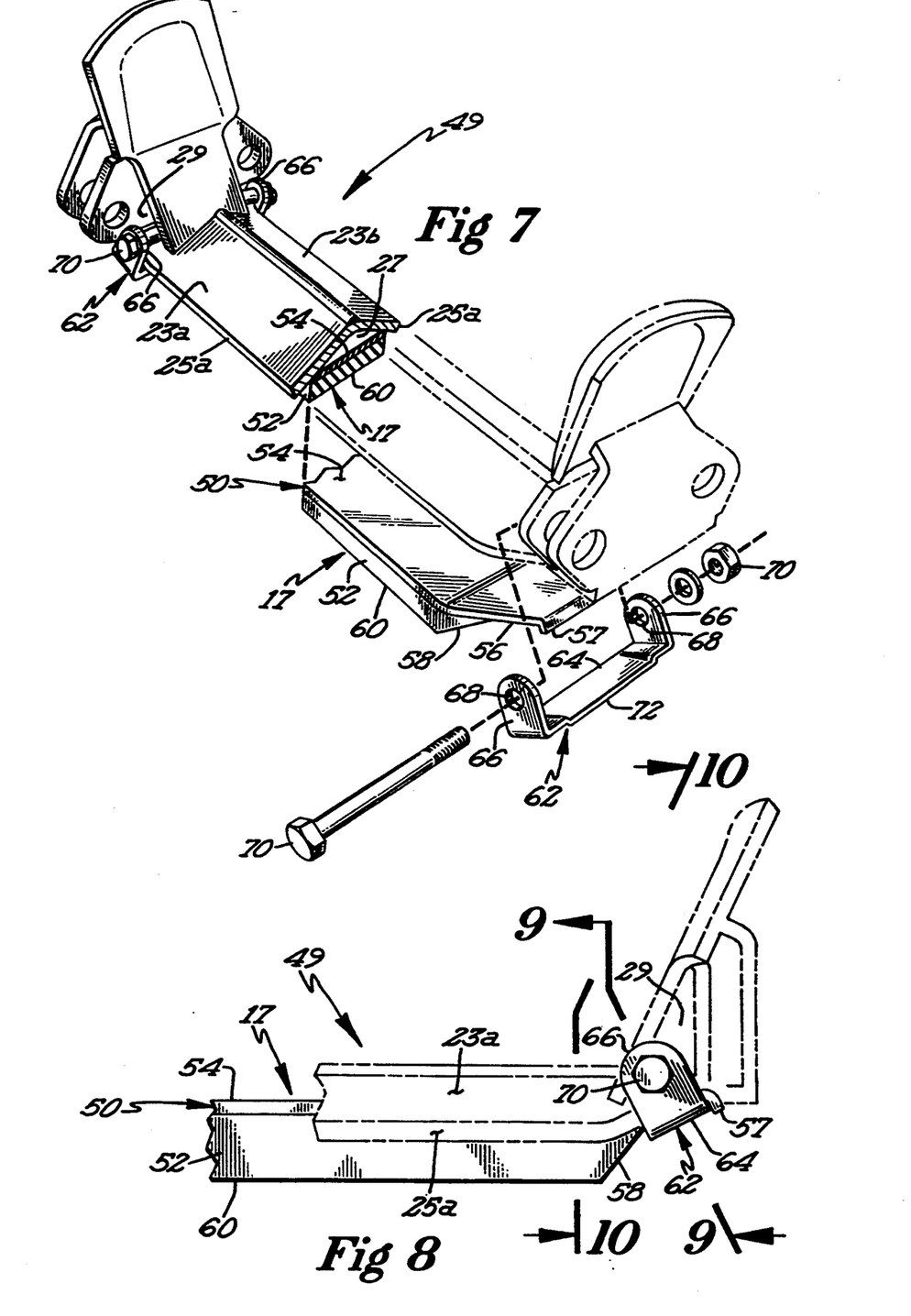
FIG. 7 is a perspective view, partially exploded and partially in phantom of a track section and an attached track bolster in accordance with the present invention.
FIG. 8 is a partial side elevation view, partial phantom outline of the cushioned track section shown in FIG. 7.

FIG. 1 shows a track belt 10 comprising individual track sections 12 mounted for wrap around engagement with the wheels 14 of a vehicle, such as a skid steer loader 16. Each track section 12 is double pivotally connected to adjacent track sections as will be explained below and each track section 12 may have a track bolster 17 (FIG. 7) in accordance with the present invention attached thereto.

Referring now to FIGS. 2–12, a cushioned track section comprising a track bolster 17 and its attachment to a track section 12 in accordance with the present invention will be described. Track section 12 is substantially symmetrical about its midpoint such that it may be reversed and used in a track belt on either side of a vehicle. Each track section comprises a rigid, ground engaging base pad 18 having an elongated shape defining a longitudinal direction of extent. Base pad 18 includes a traction enhancer 19, which may simply be a weld bead, and serves as a cross bar connecting a pair of spaced apart side wall structures 20 and 22 that project upwardly from the opposite ends of base pad 18. Base pad 18 has a cross section similar to an inverted "v" when in the ground engaging position (FIGS. 4, 7, 9, and 10). That is, base pad 18 includes a pair of diverging cross bar members 23a and 23b, which may be integral along one edge thereof, that each have a ground engaging cleat 25a and 25b, respectively. Cleats 25 are spaced a distance $d_3$ apart. A recess 27 is defined between the members 23a and 23b that from the base pad 18. As will be explained below, in one embodiment of the present invention track bolster 17 is received partially within recess 27 and between members 23a and 23b.

Side wall structures 20 and 22 are substantially identical and so it will be understood that a description of one side wall structure will suffice as a description of the other. Each side wall structure 20 and 22 includes a side plate 24 that is angularly supported by a side plate support structure, each of which in turn comprises inner and outer longitudinally spaced apart support segments 26 and 28. Inner support segment 26 is spaced from side plate 24 so as to define a gap 29 therebetween. Each side plate 24 is substantially continuously outwardly inclined and comprises a lower portion 30 and an upper portion 32 angularly bent inwardly relative to lower portion 30 at bend 33 of side plate 24. As best seen in FIG. 6, lower portion 30 is disposed at an angle $\theta$ relative to an axis drawn parallel to the longitudinally extending base pad 18. Preferably, $\theta$ should fall within the range of about sixty-three degrees (63°) to about sixty-eight degrees (68°) relative to the base pad. Lower portion 30 is angled so as to firmly engage the hard tire tread 34 of tire 14, which is shown in phantom in FIG. 2. If lower portion 30 of side plate 24 were disposed at an angle $\theta$ less than sixty-three degrees (63°), that is, if lower portion 30 were flatter relative to base pad 18, the tire 14 would tend to "walk" up side plate 24 under substantially normal operating conditions. Similarly, if $\theta$ were greater than about sixty-eight degrees (68°), that is, if lower portion 30 were steeper, lower portion 30 would not guide the tire 14 by engagement with the tread section 34 and would instead contact the side wall 35 of the tire 14, resulting in side wall wear and damage. Preferably, lower portion 30 has a substantially planar configuration to avoid damaging the tread 34 of the tire 14.

The inner surface of upper portion 32 of side plate 24 is disposed at an angle $\beta$ relative to an axis drawn parallel to the longitudinally extending base pad 18. Preferably, $\beta$ should be within the range of about seventy degrees (70°) to about seventy-five degrees (75°); that is, upper portion 32 should be bent inwardly towards the center of base pad 18 about bend 33 such that the inner tire engaging surface of upper portion 32 is disposed at an angle of about four degrees (4°) to about seven degrees (7°) relative to the inner tire engaging surface of lower portion 30. This inward inclination of upper portion 32 will substantially prevent the tire 14 from climbing tip over the side plate 24 of track section 12 in side loading conditions. Preferably, and as best seen in FIGS. 3–5, side plate upper portion 32 has a somewhat convex tire engaging surface. In other words, tipper portion 32 is bubbled inwardly such that the inwardly facing surface of upper portion 32 assumes a curved-away configuration so as to present a rounded, more gentle support to the tire side wall 35. Stated otherwise, outer edge 36 of tipper portion 32 is curved outwardly so as to avoid the presentation of sharp edges to the tire side wall 35. This configuration helps reduce tire wear and avoid tire damage, particularly to the tire side wall 35, during side loading situations when tire 14 tends to crawl out of flexible belt 10 by not presenting sharp edges to tire 14 tinder such circumstance.

Figure 2:
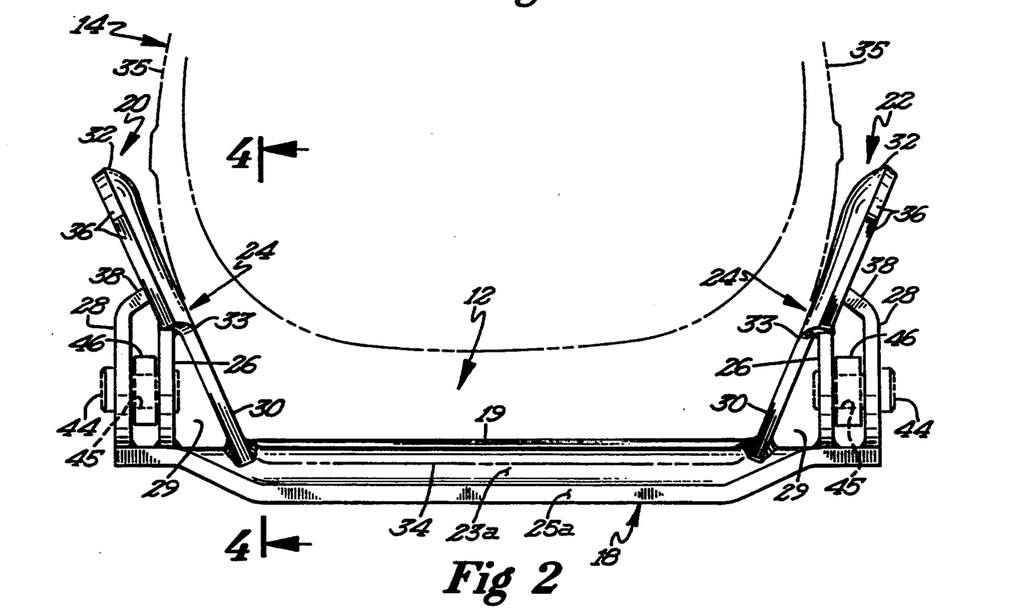
FIG. 2 is a front elevation view of a track section shown in FIG. 1.
Figures 3, 4, 5, 6:
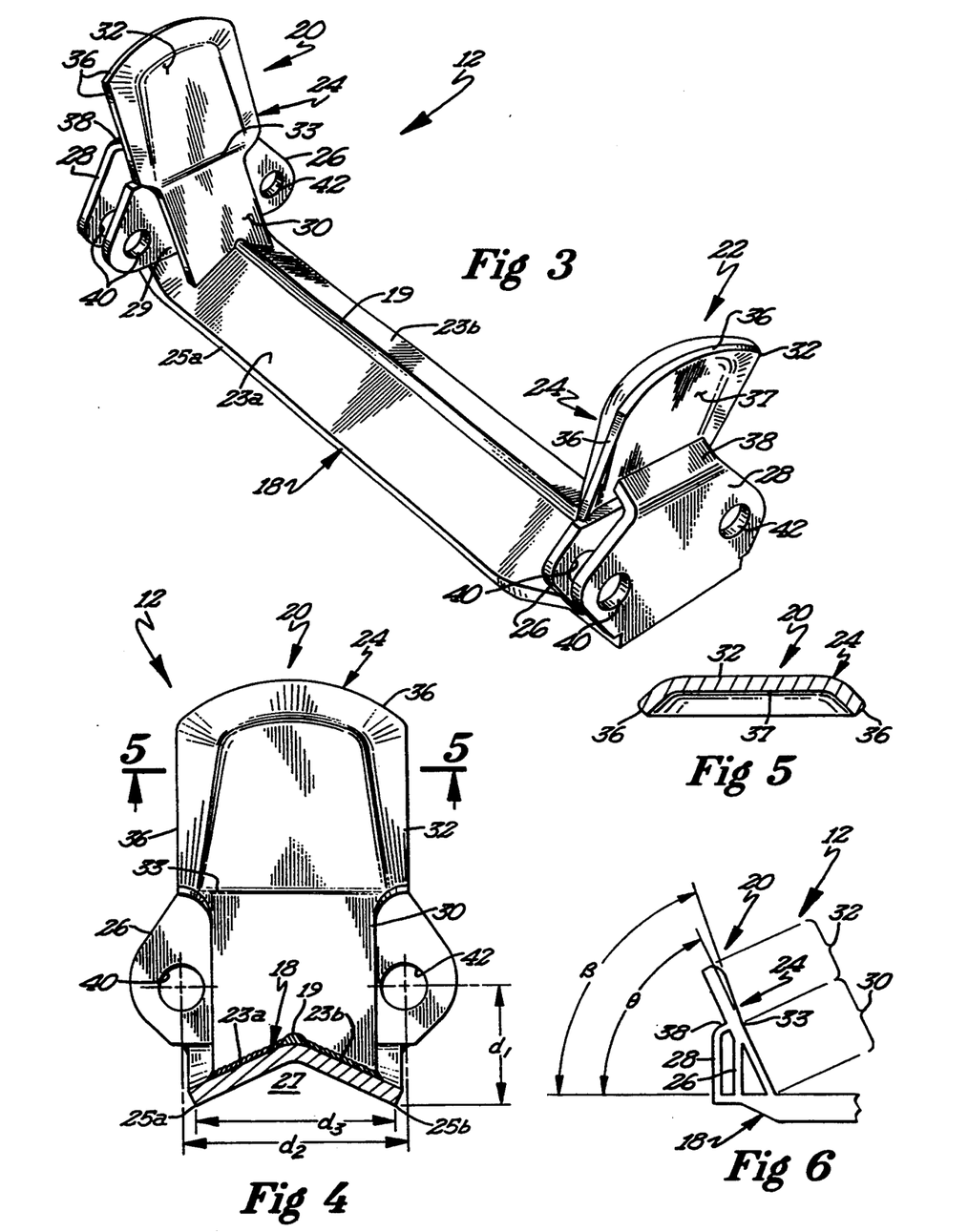
FIG. 3 is a perspective view of the track section shown in FIG. 2.
FIG. 4 is a side elevation, partial cross sectional view of the track section shown in FIG. 2 taken along cutting plane 4—4 of FIG. 2.
FIG. 5 is a cross sectional view of the side plate of the track section shown in FIG. 4 taken along cutting plane 5—5 of FIG. 4.
FIG. 6 is a schematic view of an end of a track section in accordance with the present invention and illustrates the angular dispositions of the lower and upper portions of the side plates.

Referring particularly to FIGS. 2–4, support segments 26 and 28 are rigidly attached to base pad 18 at one end thereof and at the other end thereof are rigidly attached to outer surface 37 of side plate 24. Support segment 28 is slightly longer than support segment 26, which has a substantially planar configuration as seen in FIG. 3, and has an upper portion 38 bent inwardly to engage outer surface 37 of side plate 24. Support segments 26 and 28 support side plate 24 in its angular disposition as previously noted. Both support segments 26 and 28 have a pair of laterally spaced apart apertures 40 and 42. Apertures 40 of support segments 26 and 28 are aligned so as to receive a pivot pin 44 as are apertures 42 of support segments 26 and 28. Pivot pin 44 extends through an aperture 45 (shown in phantom) in a link 46 (shown in phantom) that extends between adjacent track sections. Thus, support segments 26 and 28 along with the aligned apertures 40 and 42 form a pair of clevis type structures that along with a pair of pivot pins 44 and links 46 form a pivotal linkage between adjacent track sections. These linkage mechanisms on each side of track section 12 thus form the double linkage mechanism previously described.

Apertures 40 and 42 are each spaced a first distance $d_1$ from the ground when the track section 12 is in a ground engaging position as shown in FIGS. 1, 2, and 4. Additionally, apertures 40 and 42 are spaced a second distance $d_2$ apart frown each other. Preferably, first distance $d_1$ is less than second distance $d_2$. This reduces the tendency of double pivot track section 12 to flex and rock during operation. In a preferred embodiment first distance $d_1$ is preferably less than about seventy percent of second distance $d_2$, that is $$d_1 \leq 0.7 d_2.$$

Additionally, first distance $d_1$ is preferably greater than about forty percent of second distance $d_2$, that is $$0.4 d_2 \leq d_1.$$

Thus, first distance $d_1$, that is, the distance from the aperture centers to the ground preferably lies within a size range of about forty percent to about seventy percent of the second distance $d_2$, the distance between apertures 40 and 42, or $$0.4d_2 \leq d_1 \leq 0.7d_2.$$

This distance ratio advantageously allows the use of double pivot linkages in new use situations in that it reduces the rocking and flexing found in prior art double pivot linkages, such as that of the Keller '271 patent where the ratio of the distance of the aperture to the ground to the distance between apertures is greater than one to one in one embodiment (FIG. 2) and two to one in another (FIG. 5). This new track section structure thereby further reduces the wear experienced by double pivot linkages over that seen in single pivot linkages.

In the embodiment of the present invention shown in the drawings and disclosed herein, base pad 18, side plate 24, and support segments 26 and 28 are each fabricated as individual pieces that are then rigidly attached to each other by known means such as welding. Other means known to the art for rigidly engaging the aforementioned pieces may equally be used so long as those joining methods produce a track section able to withstand the stresses and forces that accompany use thereof.

While the previous discussion has described a track section useful for joining to other similar track sections to form a wrap around belt, a track bolster that may in one or more embodiments be removably attached to a track section will now be described. Referring particularly to FIGS. 7-10, a cushioned track section 49 comprising a track bolster 17 attached to a track section 12 in accordance with the present invention will be described. Track bolster 17 comprises a substrate 50 having a cushion 52 fixedly attached thereto.

Figures 9, 10, 11:
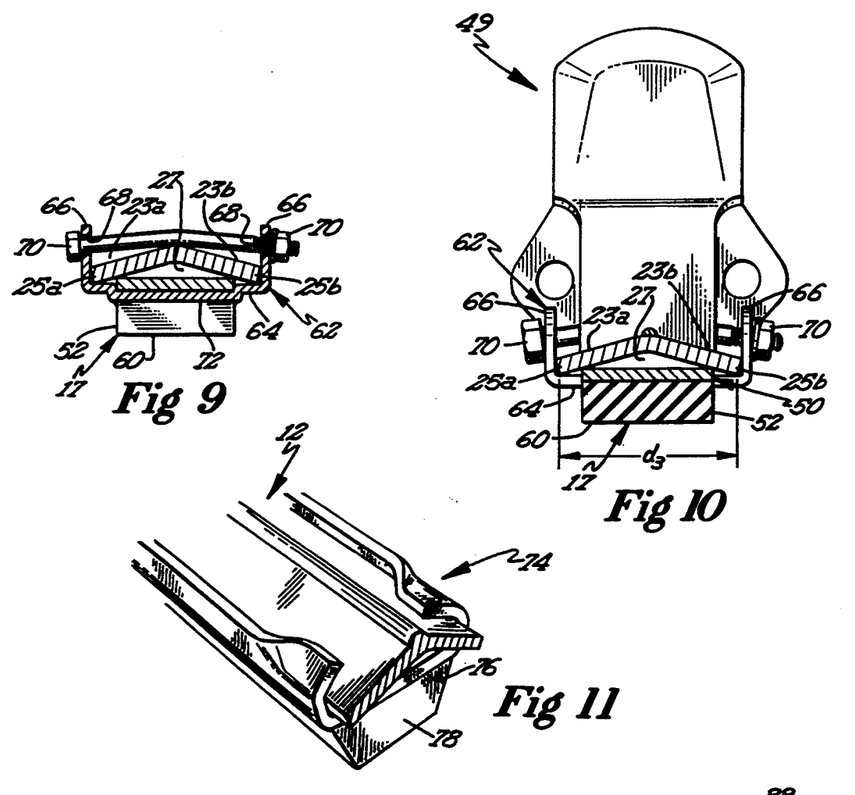
FIG. 9 is a view of the cushioned track section shown in FIG. 8 taken along cutting plane 9—9 of FIG. 8.
FIG. 10 is a view of the cushioned track section shown in FIG. 8 taken along cutting plane 10—10 of FIG. 8.
FIG. 11 is a partial perspective view of a cushioned track section showing an alternative embodiment of the present invention wherein the track bolster is attached by bending the substrate over the diverging cross bar members of the base pad.

Cushion 52 is formed of a semi-rigid, yieldable nonmarking material. Such materials include, without limimitation, rubber, wood and thermoplastic resins such as urethane or polycarbonate. That is, in general, the cushion should be made from a material softer than work surfaces such as concrete, asphalt or the like. Thus, when attached to a track section, the cushion will contact the work surface rather than the hard steel cleats 25a and 25b and will not tend to mark, gouge or otherwise damage the work surface as do cleats 25a and 25b. Substrate 50 is preferably a hard, non-yielding material such as steel and comprises a central portion 54 that is substantially flat and a pair of end portions 56 that bend upwardly as shown in the Figures away from substrate 50 and cushion 52. End portions 56 are also substantially planar. A lip 57 extends downward from end portion 56 as shown in the Figures at approximately a ninety degree angle. Lip 57 cooperates with bracket 62 so as to trap track bolster 17 and prevent its movement in a longetudial direction, that is, along the length of track section 12. Substrate 50 in the embodiment shown in FIGS. 7-9 has a width less than the width $d_3$ between the cleats 25a and 25b such that bolster 17 may be partially received within recess 27 as seen in FIGS. 9 and 10. By disposing track bolster 17 partially within recess 27, substrate 50 of bolster 17 engages the under-surface of diverging cross bar members 23a and 23b and is substantially prevented from rocking with respect thereto.

In the embodiment shown in the Figures, cushion 52 has a pair of beveled end surfaces 58 that lie at approximately a 45° angle with respect to the substantially planar lower surface 60. Beveled end surfaces 58 are angled so as to avoid presenting a sharp comer that might catch and cause cushion 52 to be tom away from substrate 50 during sideways motions of the track sections, such as commonly occur during use with a skid-steer type of loaders. Lower surface 60 is the actual work surface engaging surface of the cushioned track section 49 shown in the Figures. Lower surface 60 presents a substantial planar, yielding contact area to the work surface such that damage to the work surface can be substantially avoided.

Track bolster 17 is attached to track section 12 by a pair of brackets 62 that form one known means of attaching track bolster 17 to the track section 12. Each bracket 62 has a substantially U-shaped configuration with an elongate bracket central section 64 and a pair of upwardly, as seen in the Figures, extending bracket ears 66. Each bracket ear 66 of each bracket 62 includes an aperture 68 for receiving a fastener such as a threaded fastener 70. Bracket 62 traps substrate end portion 56 between bracket central portion 64 and the under surface of cross bar members 23a and 23b as best seen in FIG. 9. Fastener 70 is received within gap 29 so as to overlie the cross bar of base pad 18, as best seen in FIGS. 9 and 10. As shown in those Figures, fastener 70 may comprise a threaded bolt that receives a standard nut/washer combination at the threaded end thereof. Fastener 70 may be bent substantially in the center thereof so as to conform somewhat to the configuration of the cross bar of base pad 18. By bending fastener 70 in the manner shown, however, additional tension can be placed on the attachment bracket 62 so as to more firmly grip substrate end portions 56 therein. Fastener 70 may also be a regular straight or unbent bolt. If desired, bracket 62 may be configured in the central portion 64 thereof so as to include a dimple 72 that conforms to substrate end portion 56 and therefore closely engages an end portion 56 of substrate 50.

Referring now to FIG. 11, an alternate embodiment 74 of a track bolster is shown. Track bolster 74 includes a substrate 76 of the type previously described and a cushion 78, also of the type previously described, attached thereto. Substrate 76 of embodiment 74, however, has a width exceeding that of $d_3$, the width between the cleats 25a and 25b, or in other words, a width greater than the width of base pad 18. The excess width of material of substrate 76 can be bent around cross bar members 23a and 23b so as to rigidly attach track bolster 74 to track section 12. While forming a firm and unyielding attachment of the track section 12 to track bolster 74, this particular embodiment is not, however, as easily removable as the embodiment indicated by track bolster 17. Where frequent change over between a track using cushioned sections and a track using uncushioned sections is desirable, the embodiment of track bolster 17 would be preferable.

Figure 12:
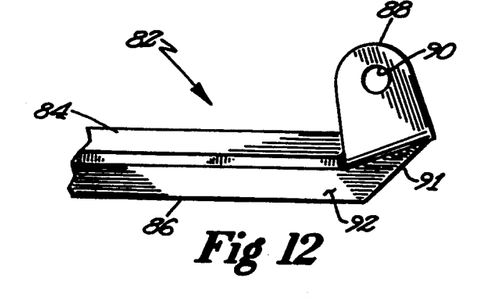
FIG. 12 is a partial perspective view of a cushioned track section showing an alternative embodiment of the present invention wherein the track bolster is attached a by fastener to a track section by a pair of upwardly extending apertured ears that are integral with the substrate.

FIG. 12 represents yet another embodiment of the present invention wherein a track bolster 82 also has a substrate 84 of the type previously described and a cushion 86 of the type previously described attached thereto. In this embodiment, substrate 84 has a curved or arched rather than substantially planar configuration so as to more closely conform to the configuration of the underside of cross bar members 23a and 23b of track section 12. Track bolster 82 also has an alternative form of attachment wherein substrate 84 includes a pair of upwardly extending substrate ears 88 at each end thereof. Each ear 88 each include an aperture 90 to receive a fastener in the manner of fastener 70. In this respect, track bolster 82 may be attached to a track section in a like manner to that shown with respect to track bolster 17, but without the need for a separate bracket such as bracket 62. Track bolster 82 is, like track bolster 17, easily removable so as to quickly change a track belt from a cushioned track belt to an uncushioned belt useful when operating on earthen or rock surfaces where damage to the surface is not of a concern.

Figure 13:
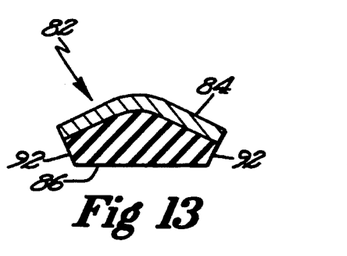
FIGS. 13–16 each show in cross section an alternative embodiment of a track bolster in accordance with the present invention.

FIGS. 13-16 illustrate different cross sectional configurations of a track bolster having an arched substrate, such as substrate 84, shown in FIG. 12. Thus, FIG. 13 illustrates a cross sectional view of the embodiment of track bolster 82 shown in FIG. 12. In this embodiment, substrate 86 in addition to including a beveled end surface 91 as shown in FIG. 12, also includes beveled side surfaces 92. Beveled end surfaces 91 and 92 help prevent tearing of the cushion 86 away from substrate 84 by not presenting sharp right-angle corners to an obstacle or the work surface during operation.

Figure 14:
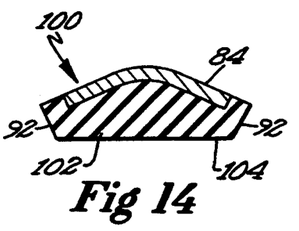

FIG. 14 illustrates another embodiment of a track bolster wherein a track bolster 100 includes a substrate 84 and a cushion 102 attached thereto. In this embodiment, cushion 102 has a width exceeding that of $d_3$, the width between cleats 25a and 25b. Cushion 102 thus provides a substantially broader traction surface 104.

Figure 15:
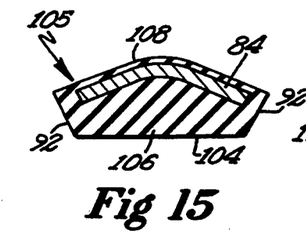

FIG. 15 illustrates another embodiment 105 of the present invention wherein substrate 84 is molded within cushion 106. In this embodiment a thin portion 108 of cushion 104 would lie between substrate 104 and the underside of the cross bar formed by cross bar members 23a and 23b of base pad 18, which should aid in reducing any otherwise destructive engagement between substrate 84 and base pad 18.

Figure 16:
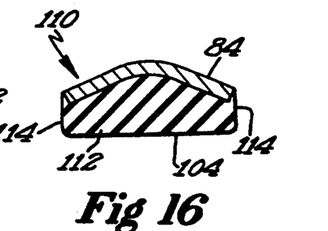

FIG. 16 represents yet another cross sectional embodiment of a track bolster 110 wherein a substrate 84 has a cushion 112 attached thereto. Cushion 112, however, does not include beveled side surfaces 92 and rather has side surfaces 114 that lie substantially transverse to traction surface 104. It will be understood that a track belt 10 such as that shown in FIG. 1 will include adjustable links for taking up slack in the track belt as it is used in normal operations. Such adjustment mechanisms are well known in the art and will not be described in detail herein. Generally, such mechanisms include links having a plurality of laterally extending apertures so that the distance between adjacent track sections may be varied and reduced as the track belt normally lengthens during use thereof. It will be further understood that, though described primarily as being used on a skid-steer type of machine, the present cushioned track section and cushioned track belt may find use on any machine where track belts are commonly used today.

The present invention having thus been described, other modifications, alterations, or substitutions may now suggest themselves to those skilled in the art, all of which are within the spirit and scope of the present invention. It is therefore intended that the present invention be limited only by the scope of the attached claims below.

We claim:

1. A cushioned track section adapted to be linked to a plurality of similar track sections to form a flexible track belt for wraparound mounting on a vehicle tire, said track belt adapted for use on a work surface such as concrete, asphalt or other like artificial surface, without substantial damage thereto, each said track section comprising: a rigid, ground engaging base pad of elongated shape, said base pad having a rigid ground-engaging cross bar having an inverted v-shaped cross section when the track section is in a ground-engaging position, said cross bar having a pair of substantially parallel ground engaging cleats spaced a distance $d_3$ apart:

a pair of spaced apart sidewall structures projecting upwardly from the opposite longitudinal ends of said base pad in its ground engaging position, said crossbar serving to connect said sidewall structures; and a track bolster, said track bolster comprising:
a substrate;
a cushion fixedly attached to said substrate; and
means for attaching said track bolster to said track section such that said cushion engages the work surface; and means for connecting adjacent base pads to form said flexible track belt; and wherein: each of said sidewall structures includes:
inner and outer longitudinally spaced apart support segments, each support segment having top and bottom ends with said bottom end engaging said base pad; and a side plate having a bottom end engaging said base pad, an outer surface and an inwardly curved tire engaging inner surface, said outer surface engaging said inner and outer support segments, whereby each said side plate is angularly supported by said base pad and said inner and outer support segments, said side plate spaced from said inner support segment so as to define a gap therebetween;

said substrate has an elongate configuration defined by a substantially planar substrate central portion and a pair of substantially planar substrate end portions, said cushion being fixedly attached to said central portion; and wherein said means for attaching said track bolster to said track section comprises a pair of substantially U-shaped brackets having a pair of aligned apertures for receiving a fastener, each said bracket trapping a said bracket end portion between said bracket and said base pad, said fastener extending through a first of said aligned apertures, through said gap, and through the other aligned aperture.

2. The cushioned track section of claim 1 wherein said cushion is made of a thermoplastic resin.

3. The cushioned track section of claim 2 wherein said thermoplastic resin is a polycarbonate.

4. The cushioned track section of claim 1 wherein said cushion has a substantially rectangular cross section.

5. The cushioned track section of claim 1 wherein said cushion has a substantially flat ground engaging surface and a pair of end surfaces, said end surfaces lying at an angle relative to said ground engaging surface.

6. The cushioned track section of claim 5 wherein said angle is approximately forty-five degrees (45°).

7. The cushioned track section of claim 1 wherein said base pad of said track section has a recess and said substrate of said track bolster has a width less than the distance $d_3$ between the cleats of said base pad such that said substrate of said track bolster is received within said recess when said bolster is attached to said cushioned track section.

8. The cushioned track section of claim 1 wherein said fastener comprises a threaded bolt.

9. The cushioned track section of claim 8 wherein said bolt is bent substantially at the center thereof such that said bolt exerts a tension force on said bracket to tightly hold said substrate end portions against said cross bar.

10. The cushioned track section of claim 1 wherein each said bracket includes a dimple configured to receive a said end portion of said substrate.

11. The cushioned track section of claim 1 wherein said substrate having a width greater than $d_3$, said means for attaching said track bolster to said track section comprising bending said substrate around said base pad.

12. The cushioned track section of claim 11 wherein said substrate has a width greater than $d_3$ and said means for attaching said track bolster to said track section comprises bending said substrate around said base pad.

13. The cushioned track section of claim 12 wherein said cushion has a substantially planar ground engaging cushion surface and a pair of opposed side walls and a pair of opposed end walls, said side walls and end walls being angularly disposed relative to said ground engaging cushion surface.

14. The cushioned track section of claim 13 wherein the angles defined by said walls and said ground engaging cushion surface is substantially a right angle.

15. The cushioned track section of claim 13 wherein the angles defined by said walls and said ground engaging surface is greater than ninety degrees.

16. The cushioned track section of claim 11 wherein said cushion is formed from a molded synthetic material and said substrate is molded within said cushion such that a layer of cushion material lies between said substrate and said diverging cross bar members.

17. A cushioned track section adapted to be linked to a plurality of similar track sections to form a flexible track belt for wraparound mounting on a vehicle tire, said track belt adapted for use on a work surface such as concrete, asphalt or other like artificial surface, without substantial damage thereto, each said track section comprising:
a rigid, ground engaging base pad of elongated shape, said base pad having a rigid ground-engaging cross bar having an inverted v-shaped cross section when the track section is in a ground-engaging position, said cross bar having a pair of substantially parallel ground engaging cleats spaced a distance $d_3$ apart;
a pair of spaced apart sidewall structures projecting upwardly from the opposite longitudinal ends of said base pad in its ground engaging position, said crossbar serving to connect said sidewall structures; and
a track bolster, said track bolster comprising:
a substrate;
a cushion fixedly attached to said substrate; and
means for attaching said track bolster to said track section such that said cushion engages the work surface; and
means for connecting adjacent base pads to form said flexible track belt; and wherein said cross bar includes a pair of diverging cross bar members defining a recess therebetween and said substrate has an upper surface configured to conform substantially to the configuration of said recess.

18. The cushioned track section of claim 17 wherein said substrate having a width greater than $d_3$, said means for attaching said track bolster to said track section comprising bending said substrate around said base pad.

19. The cushioned track section of claim 17 wherein said cushion has a substantially planar ground engaging cushion surface and a pair of opposed side walls and a pair of opposed end walls, said side walls and end walls being angularly disposed relative to said ground engaging cushion surface.

20. The cushioned track section of claim 19 wherein the angles defined by said walls and said ground engaging cushion surface is substantially a right angle.

21. The cushioned track section of claim 19 wherein the angles defined by said walls and said ground engaging surface is greater than ninety degrees.

22. The cushioned track section of claim 17 wherein said cushion is formed from a molded synthetic material and said substrate is molded within said cushion such that a layer of cushion material lies between said substrate and said diverging cross bar members.

23. A track bolster for a track section that is adapted to be linked to a plurality of similar track sections to form a flexible track belt for wraparound mounting on a vehicle tire, said track belt adapted for use on a work surface such as concrete, asphalt or other like artificial surface, without substantial damage thereto, the track section comprising:
a rigid, ground engaging base pad of elongated shape, the base pad having a rigid ground-engaging cross bar having an inverted v-shaped cross section when the track section is in a ground-engaging position, the cross bar having a pair of substantially parallel ground engaging cleats spaced a distance $d_3$ apart;
a pair of spaced apart sidewall structures projecting upwardly from the opposite longitudinal ends of the base pad in its ground engaging position, the crossbar serving to connect the sidewall structures, each of the sidewall structures includes:
inner and outer longitudinally spaced apart support segments, each support segment having top and bottom ends with the bottom end engaging the base pad; and
a side plate having a bottom end engaging the base pad, an outer surface and an inwardly curved tire engaging inner surface, the outer surface engaging the inner and outer support segments, whereby each side plate is angularly supported by the base pad and the inner and outer support segments, the side plate spaced from the inner support segment so as to define a gap therebetween;
wherein said track bolster comprises:
a substrate; and
a cushion fixedly attached to said substrate, wherein the cross bar includes a pair of diverging cross bar members defining a recess therebetween and said substrate has an upper surface configured to conform substantially to the configuration of the recess; and
means for attaching said track bolster to the track section such that said cushion engages the work surface.

24. The track bolster of claim 23 wherein said substrate has a width greater than $d_3$ and said means for attaching said track bolster to said track section comprises bending said substrate around said base pad.

25. The track bolster of claim 24 wherein said cushion has a substantially planar ground engaging cushion surface and a pair of opposed side walls and a pair of opposed end walls, said side walls and end walls being angularly disposed relative to said ground engaging cushion surface.

26. The track bolster of claim 25 wherein the angle defined by said walls and said ground engaging cushion surface is substantially a right angle.

27. The track bolster of claim 25 wherein the angles defined by said walls and said ground engaging surface is greater than ninety degrees.

28. The track bolster of claim 23 wherein said cushion is formed from a molded synthetic material and said substrate is molded within said cushion such that a layer of cushion material lies between said substrate and said diverging cross bar members.

* * * * *

UNITED STATES PATENT AND TRADEMARK OFFICE
CERTIFICATE OF CORRECTION

PATENT NO. : 5,429,429
DATED : 07/04/95
INVENTOR(S) : George A. Loegering et al.

It is certified that error appears in the above-indentified patent and that said Letters Patent is hereby corrected as shown below:

col. 6, line 16, after the word "words," delete "tipper" and substitute --upper-- therefor.

col. 6, line 21, after the phrase "edge 36 of," delete "tipper" and substitute --upper-- therefor.

Signed and Sealed this

Sixteenth Day of July, 1996

Attest:

BRUCE LEHMAN

Attesting Officer     Commissioner of Patents and Trademarks